United States Patent
Elsen (10) Patent No.: US 11,720,781 B2
(45) Date of Patent: Aug. 8, 2023

(54) PARALLEL EXECUTION OF GATED ACTIVATION UNIT OPERATIONS

(71) Applicant: DeepMind Technologies Limited, London (GB)

(72) Inventor: Erich Konrad Elsen, San Francisco, CA (US)

(73) Assignee: DeepMind Technologies Limited, London (GB)

( * ) Notice: Subject to any disclaimer, the term of this patent is extended or adjusted under 35 U.S.C. 154(b) by 530 days.

(21) Appl. No.: 16/756,363

(22) PCT Filed: Oct. 20, 2017

(86) PCT No.: PCT/US2017/057611
§ 371 (c)(1),
(2) Date: Apr. 15, 2020

(87) PCT Pub. No.: WO2019/078885
PCT Pub. Date: Apr. 25, 2019

(65) Prior Publication Data
US 2021/0201113 A1   Jul. 1, 2021

(51) Int. Cl.
*G06N 3/04*     (2023.01)
*G06N 3/044*    (2023.01)
(Continued)

(52) U.S. Cl.
CPC .............. *G06N 3/044* (2023.01); *G06F 9/505* (2013.01); *G06F 9/5066* (2013.01); *G06N 3/00* (2013.01); *G06N 3/02* (2013.01); *G06N 3/04* (2013.01)

(58) Field of Classification Search
CPC ......... G06F 9/505; G06F 9/5066; G06N 3/00; G06N 3/02; G06N 3/04; G06N 3/0445
(Continued)

(56) References Cited

U.S. PATENT DOCUMENTS

| 8,126,710 B2 * | 2/2012 | Gemello | G10L 15/065 |
| | | | 704/251 |
| 10,685,285 B2 * | 6/2020 | Simard | G06N 3/0454 |

(Continued)

FOREIGN PATENT DOCUMENTS

| CN | 105389772 A | 3/2016 |
| CN | 106875013 A | 6/2017 |

(Continued)

OTHER PUBLICATIONS

Jeremy Jordan., "Neural networks: representation", Jun. 2017, retrieved from https://www.jeremyjordan.me/intro-to-neural-networks/, 10 pages. (Year: 2017).*

(Continued)

*Primary Examiner* — Ted T. Vo
(74) *Attorney, Agent, or Firm* — Fish & Richardson P.C.

(57) ABSTRACT

Methods, systems, and apparatus, including computer programs encoded on computer storage media, for interleaving matrix operations of a gated activation unit. One of the methods includes receiving a plurality of weight matrices of a gated activation unit of the neural network, the gated activation unit having two or more layers, each layer defining operations comprising: (i) a matrix operation between a weight matrix for the layer and concatenated input vectors and (ii) a nonlinear activation operation using a result of the matrix operation. Rows of the plurality of weight matrices are interleaved by assigning groups of corresponding rows to respective thread blocks, each thread block being a computation unit for execution by an independent processing unit of a plurality of independent processing units of a parallel processing device.

15 Claims, 5 Drawing Sheets

(51) Int. Cl.
*G06N 3/00* (2023.01)
*G06N 3/02* (2006.01)
*G06F 9/50* (2006.01)

(58) Field of Classification Search
USPC .......................................................... 706/30
See application file for complete search history.

(56) References Cited

U.S. PATENT DOCUMENTS

| | | | |
|---|---|---|---|
| 2016/0179574 | A1 | 6/2016 | Merrill |
| 2017/0032487 | A1 | 2/2017 | Ashari et al. |
| 2017/0220925 | A1* | 8/2017 | Alsharif ................... G06N 3/08 |
| 2019/0362223 | A1 | 11/2019 | Elsen |
| 2020/0167914 | A1* | 5/2020 | Stamatoyannopoulos .................. G06T 7/0012 |
| 2020/0320378 | A1* | 10/2020 | Vogl ......................... G06N 3/08 |

FOREIGN PATENT DOCUMENTS

| | | |
|---|---|---|
| CN | 107229967 A | 10/2017 |
| WO | WO 2016/186801 | 11/2016 |

OTHER PUBLICATIONS

Abdi et al. "Multi-Residual Networks: Improving the Speed and Accuracy of Residual Networks," arXiv 1609.05672v4, Mar. 15, 2017, 8 pages.

Appleyard et al., "Optimizing Performance of Recurrent Neural Networks on GPUs," https://arxiv.org/abs/1604.01946, Apr. 2016, 9 pages.

Arik et al. "Deep Voice Real-time Neural Text-to-Speech," arXiv 1702.07825, Feb. 24, 2017, 17 pages.

Diamos et al., "Persistent RNNs: Stashing Recurrent Weights On-Chip," Proceedings of The 33rd International Conference on Machine Learning, Jun. 2016, 10 pages.

Han et al.,"EIE: efficient inference engine on compressed deep neural network." In 2016 ACM/IEEE 43rd Annual International Symposium on Computer Architecture, pp. 243-254, Jun. 18, 2016.

Hassan et al. "SPEED: Open-Source Framework to Accelerate Speech Recognition on Embedded GPUs," IEEE EUROMICRO Conference on Digital System Design, Aug. 30, 2017, 8 pages.

International Search Report and Written Opinion issued in International Application No. PCT/US2017057663, dated Jul. 11, 2018, 15 pages.

Jafri et al., "SPEED: Open-Source Framework to Accelerate Speech Recognition on Embedded GPUs," 2017 Euromicro Conference on Digital System Design (DSD), Aug. 2017, 8 pages.

PCT International Preliminary Report on Patentability in International Appln. No. PCT/US2017/057611, dated Apr. 30, 2020, 9 pages.

PCT International Preliminary Report on Patentability in International Appln. No. PCT/US2017/057663, dated Apr. 30, 2020, 9 pages.

PCT International Search Report and Written Opinion in International Appln. No. PCT/US2017/057611, dated Jul. 9, 2018, 16 pages.

Van den Oord et al. "WaveNet: A Generative Model for Raw Audio." arXiv 1609.03499v2, Sep. 19, 2016, 15 pages.

Yang et al., "Fast sparse matrix-vector multiplication on GPUs: implications for graph mining." Proceedings of the VLDB Endowment, 4(4):231-42, Jan. 1, 2011.

Office Action in European Appln. No. 17791911.5, dated Nov. 21, 2022, 8 pages.

Office Action in Chinese Appln. No. 201780095698.1, dated Jan. 4, 2023, 23 pages.

* cited by examiner

Weight Matrices

PARALLEL EXECUTION OF GATED ACTIVATION UNIT OPERATIONS

CROSS-REFERENCE TO RELATED APPLICATION

This application is a National Stage Application under 35 U.S.C. § 371 and claims the benefit of International Application No. PCT/US2017/057611, filed Oct. 20, 2017. The disclosure of the foregoing application is hereby incorporated by reference in its entirety.

BACKGROUND

This specification relates to techniques for implementing neural networks on parallel processing hardware.

Neural networks are machine learning models that employ one or more layers of nonlinear computation units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Recurrent neural networks generate, for a current time step, an output that is informed by other outputs generated for one or more previous time steps. Some recurrent neural networks employ gated activation units. Such recurrent neural networks may be referred to as gated recurrent neural networks.

Gated activation units maintain a type of memory by implementing functions that control how much information generated in a previous time step should be remembered and how much should be forgotten. Common gated activation units include Long Short Term Memory units (LSTM units), Gated Recurrent Units (GRUs), several variants thereof.

In general, a gated activation unit updates a current hidden state using at least the previous hidden state and a current input. Updating the hidden state generally involves one or more linear transformations and one or more nonlinear activations. Each linear transformation can use a weight matrix and a bias vector. Training a gated recurrent neural network thus involves learning the weight matrices and bias vectors for each gated activation unit.

Figure 1:
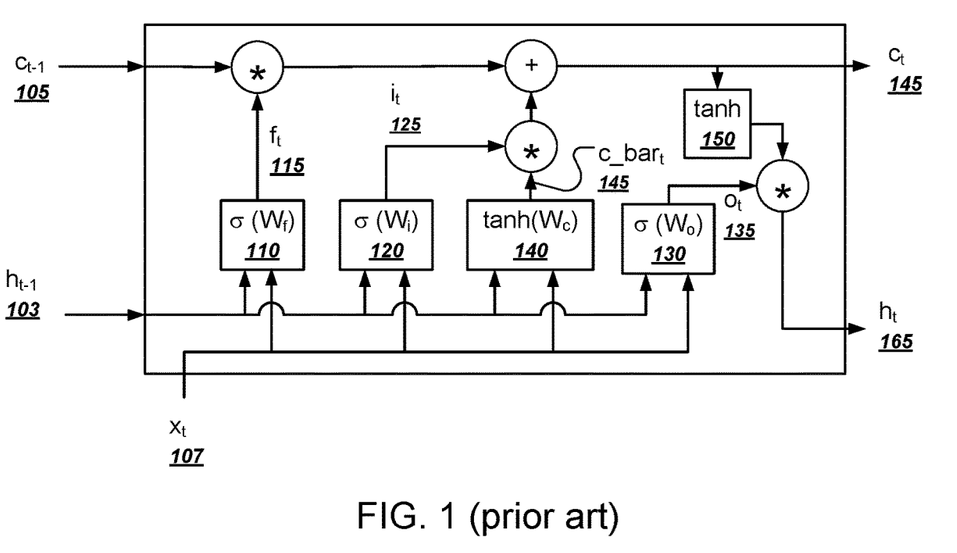
FIG. 1 illustrates a prior art Long Short Term Memory (LSTM) unit.

FIG. 1 illustrates a prior art LSTM unit 100. The LSTM unit 100 maintains both a hidden state, $h_t$, as well as a cell state, $c_t$. The LSTM unit 100 implements a forget gate, which determines how much of the previous hidden state to forget; and an input gate, which determines which values of the cell state to update, and an output gate, which determines which values to output.

The operations of the LSTM unit 100 can be defined by the following equations, in which the previous hidden state $h_{t-1}$ corresponds to $h_{t-1}$ 103, a previous cell state $c_{t-1}$ corresponds to $c_{t-1}$ 105, and the current input $x_t$ corresponds to $x_t$ 107. In this context, "*" refers to pointwise multiplication, "+" refers to pointwise addition, and "σ" is a sigmoid activation function. The notation "$W_x[h_{t-1}, x_t]$" refers to matrix multiplication of a matrix $W_x$ by a vector of $h_{t-1}$ concatenated with $x_t$. Some literature splits each matrix $W_x$ into two matrices, W and U, in which case W is multiplied with $h_{t-1}$ and U is multiplied by $x_t$. The operations of LSTM unit 100 are defined by the following equations:

$$f_t = \sigma(W_f[h_{t-1}, x_t] + b_f) \quad (1)$$

$$i_t = \sigma(W_i[h_{t-1}, x_t] + b_i) \quad (2)$$

$$o_t = \sigma(W_o[h_{t-1}, x_t] + b_o) \quad (3)$$

$$c\_bar_t = \tanh(W_c[h_{t-1}, x_t] + b_c) \quad (4)$$

$$c_t = f_t * c_{t-1} + i_t * c\_bar_t \quad (5)$$

$$h_t = o_t * \tanh(c_t) \quad (6)$$

A forget gate 110 corresponds to Equation (1) and generates $f_t$ 115; an input gate 120 corresponds to Equation (2) and generates $i_t$ 125; and an output gate 130 corresponds to Equation (3) and generates $o_t$ 135. A tanh layer 140 corresponds to Equation (4) and generates a vector of candidates c_bar$_t$ 145 for adding to the current cell state. A current cell state $c_t$ 155 is given by Equation (5). A last tanh layer 150 uses the computed cell state $c_t$ 155 to generate the current hidden state $h_t$ 165 according to Equation (6).

Each of Equations (1), (2), (3), and (4) specifies performing a matrix operation between a respective weight matrix $W_n$ for the corresponding layer and the current input vectors $x_t$ and $h_{t-1}$. The result is then added to a respective bias vector $b_n$ to the result. The result of these calculations is then fed through nonlinear activation functions σ and tanh to generate a final output vector $h_t$ for time step t.

Figure 2:
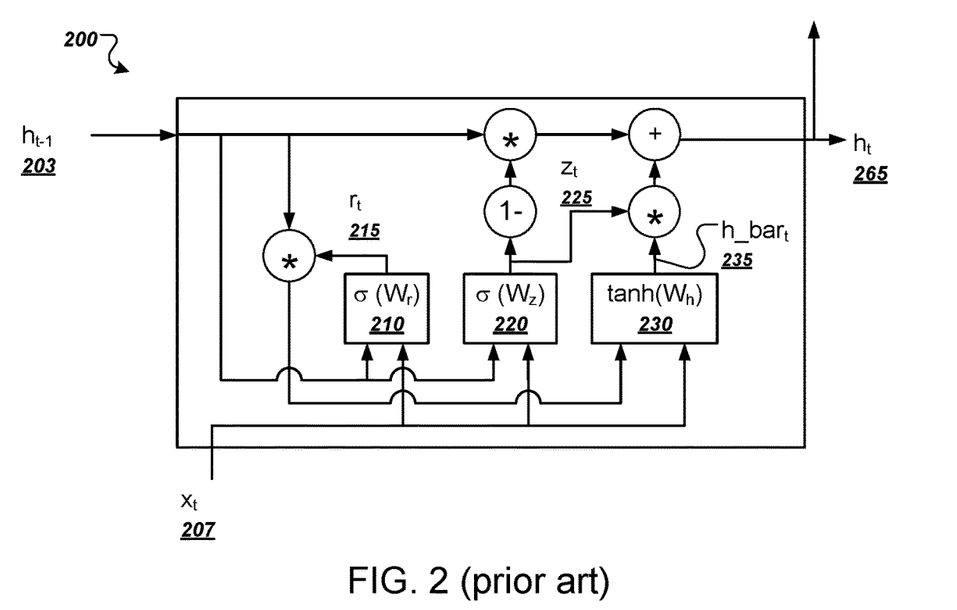
FIG. 2 illustrates a prior art gated recurrent unit (GRU).

FIG. 2 illustrates a prior art gated recurrent unit (GRU) 200. A main difference between the GRU 200 and the LSTM unit 100 is that the GRU 200 effectively merges the LSTM cell state and hidden state into just a hidden state. Therefore, the GRU 200 receives as input a previous hidden state and outputs only a current hidden state for a given input $x_t$.

The operations of the GRU 200 are generally defined by the following equations, in which the previous hidden state $h_{t-1}$ corresponds to $h_{t-1}$ 203 and the current input $x_t$ corresponds to $x_t$ 207.

$$z_t = \sigma(W_z[h_{t-1}, x_t] + b_z) \quad (7)$$

$$r_t = \sigma(W_r[h_{t-1}, x_t] + b_r) \quad (8)$$

$$h\_bar_t = \tanh(W_h[r_t * h_{t-1}, x_t] + b_h) \quad (9)$$

$$h_t = (1 - z_t) * h_{t-1} + z_t * h\_bar_t \quad (10)$$

A reset gate 210 corresponds to Equation (8) and generates $r_t$ 215. An update gate 220 corresponds to Equation (7) and generates $z_t$ 225. A tanh layer 230 corresponds to Equation (9) and generates h_bar$_t$ 235. The final hidden state $h_t$ 265 is then computed according to Equation (10).

As can be seen, the GRU 200 is somewhat simpler than the LSTM unit 100 in that it implements fewer gates and activation functions. But like the LSTM 100, the GRU 200 also uses a number of matrix operations using a weight matrix $W_n$ and a current input $x_t$, and a respective bias vector $b_n$ is then added to the result. The result of these calculations is also then fed through respective nonlinear activation functions σ or tanh.

Some aspects of the architecture of gated activation units lend themselves to parallel processing techniques. In particular, none of the operations of Equations (1)-(4) for the LSTM unit depend on each other, and none of the operations of Equations (7)-(9) for the GRU depend on each other. Furthermore, because these operations involve matrix multiplications and point-wise addition, multiple processing devices, e.g., the streaming multiprocessors (SMs) of a graphics processing unit (GPU) can be used to compute partial results of the matrix operations, and then partial results can be combined.

SUMMARY

This specification describes techniques for performing the operations of gated activation units on parallel processing hardware.

Thus in one aspect a method, in particular of implementing a neural network on a parallel processing device, comprises receiving a plurality of weight matrices of a gated activation unit of the neural network. The gated activation unit may have two or more layers, each layer defining operations comprising: (i) a matrix operation between a weight matrix for the layer and concatenated input vectors and (ii) a nonlinear activation operation using a result of the matrix operation. The matrix operation typically comprises a matrix multiplication but in principle other matrix operations may also be implemented. The method interleaves rows of the plurality of weight matrices by assigning groups of corresponding rows to respective thread blocks. Typically each thread block comprises a computation unit for execution by an independent processing unit of a plurality of independent processing units of a parallel processing device. As described later, such an approach can provide advantages including removing the necessity of performing a thread block synchronization step, which might otherwise require writing a set of results to a storage area from where they can be accessed by a next stage of processing.

There is also described a method of processing data using a neural network implemented in this way. The processing may comprise: receiving, by each thread block, input vectors; and generating, by each thread block, a respective portion of a current state vector. The generating may include performing a plurality of partial matrix operations using one or more groups of corresponding rows of the plurality of weight matrices assigned to the thread block and a concatenation of the input vectors. The generating may further include performing a plurality of nonlinear activation operations using respective results of the plurality of partial matrix operations. Optionally multiple portions of the current state vector may be generated at least partially in parallel.

In some implementations interleaving the rows may comprise assigning at least one row from every weight matrix of the plurality of weight matrices to each thread block, and/or assigning a same number of rows to all thread blocks. This can facilitate efficient use of the available processing hardware.

The gated activation unit may comprise, for example, a gated recurrent unit or a long short term memory unit of the neural network, or another recurrent neural network unit.

In some implementations the operations of a layer may include a bias addition operation between a result of a matrix operation for the layer and a bias vector for the layer; this can improve performance of the neural network. More particularly this may comprise distributing portions of the bias vector to each thread block of the plurality of thread blocks and adding a portion of the bias vector to a result of a matrix operation.

Some implementations comprise interleaving rows of the plurality of weight matrices by warps such that all warps receive some rows from every weight matrix and corresponding rows from every weight matrix are assigned to the same warp. Some implementations may additionally or alternatively comprise interleaving values of the plurality of weight matrices by threads such that all threads receive some values from every weight matrix and corresponding values from every weight matrix are assigned to the same thread.

In a related aspect a system is configured to implement a neural network on a parallel processing device. The neural network may comprise at least one gated activation unit having a plurality of weight matrices. The gated activation unit may have two or more layers, each layer defining operations comprising: (i) a matrix operation between a weight matrix for the layer and concatenated input vectors and (ii) a nonlinear activation operation using a result of the matrix operation. The system may be configured to interleave rows of the plurality of weight matrices by assigning groups of corresponding rows to respective thread blocks, each thread block being a computation unit for execution by an independent processing unit of a plurality of independent processing units of the parallel processing device.

The system may be further configured such that each thread block receives input vectors and generates a respective portion of a current state vector. One or more of the thread blocks may be configured to perform a plurality of partial matrix operations using one or more groups of corresponding rows of the plurality of weight matrices assigned to the thread block and a concatenation of the input vectors, and to perform a plurality of nonlinear activation operations using respective results of the plurality of partial matrix operations. The system may be further configured to perform others of the functions described above.

Particular embodiments of the subject matter described in this specification can be implemented so as to realize one or more of the following advantages. A parallel processing device can generate all output values of a gated activation unit in parallel or substantially in parallel and without requiring any block synchronizations. A model can be trained to exactly fit the available processing hardware, which can result in optimal load balancing and resource utilization. A gated recurrent neural network can use the parallel processing techniques described in this specification to compute outputs in real-time or faster than real-time even for networks that have very high throughput requirements, e.g., autoregressive neural networks in which values of a signal, more particularly output data representing a distribution of values of a signal, are generated based upon previously generated values of the signal. Such networks can include audio-, video-, image-, or text-generation neural networks.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a neural network system can improve throughout and reduce latency by interleaving the matrix operations of a gated activation unit over multiple independent processing units of a parallel processing device. The examples described below will commonly refer to the independent processing units being streaming multiprocessors (SMs) having multiple processing cores and the parallel processing device being a graphics processing unit (GPU). However, the same techniques can also be implemented on other hardware devices that implement true thread parallelization with multiple independent processing units. Such devices include single instruction, multiple data (SIMD) processors generally, tensor processing units (TPUs), or other application-specific integrated circuits. In addition, where the examples mention the use of a GPU, this does not necessarily imply that graphics data is being processed or produced.

On such parallel processing devices, control over thread parallelization can be provided by program abstractions that define how threads are assigned to be executed by the multiple independent processing units. For clarity of presentation, this specification uses the terminology of common GPU program abstractions, but equivalent program abstractions that control how threads are scheduled on independent processing units can be used for other systems that are not GPUs.

A thread block, or for brevity, a block, is a group of threads that are executed by a single SM. Threads in a block can coordinate by making use of shared memory of the SM. Communication between threads in a block is therefore typically orders of magnitude faster than communicating with threads in other blocks.

A warp is a group of threads within a block and in some cases represents the smallest assignable unit of computation for a GPU. Threads in a warp typically execute instructions in lockstep. Thus, threads within a warp can, for example, fetch data from memory together. If the data required for each thread is stored in the same memory segment, all threads within a warp can read from memory with only one memory transaction. Common warp sizes are 16, 32, or 64 threads, to name just a few examples.

During execution, each block is assigned to be executed by one respective SM. The threads within the block execute on the SM until the block is complete, at which point another block can be executed by the SM. For SMs that have multiple processing cores, sometimes referred to as signal processors or execution lanes, each processing core can execute one thread. GPUs commonly have between 10 and 100 SMs, and each SM can have between 2 and 32 processing cores. Therefore, the GPU can therefore often execute hundreds of threads in parallel.

In order for blocks to make their computed data available to other blocks, the blocks must coordinate by performing a synchronization, or for brevity, a sync. Syncs are expensive performance-wise because executing the sync requires stopping execution of one or more blocks to wait. A synchronization requires all blocks to write their data to a place where another block can access it. The synchronization location can be in RAM or in the local memory of a single block.

In this specification, where a gated activation unit has two or more layers having two or more respective weight matrices, interleaving the matrix operations means that the majority of blocks of a parallel processing device, if not all blocks, will operate on some data from each of the two or more weight matrices.

Figure 3:
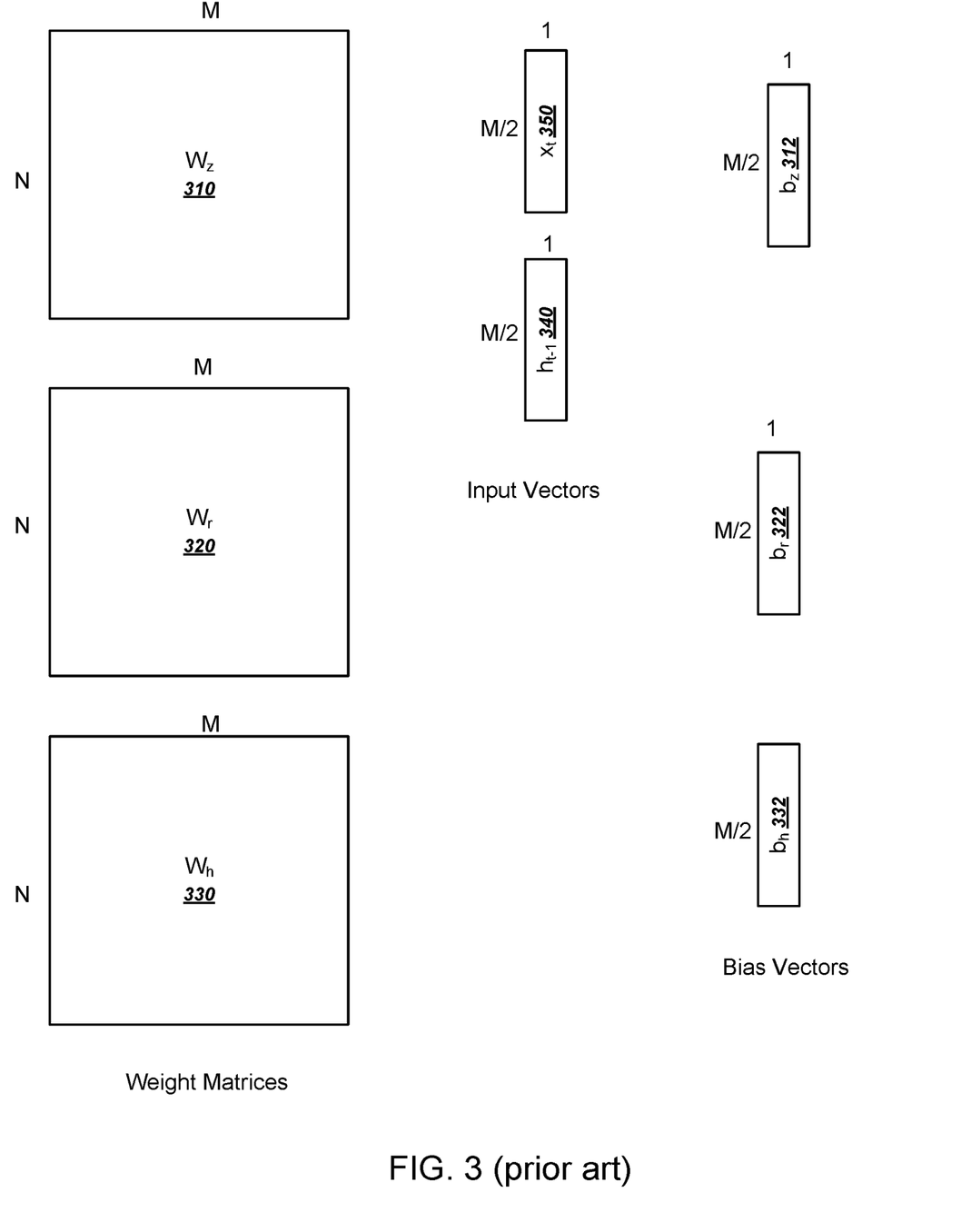
FIG. 3 is a diagram that illustrates the segments of data required to compute the output of a single prior art GRU.

FIG. 3 is a diagram that illustrates the segments of data required to compute the output of a single prior art GRU. As described above, a GRU has three weight matrices: an update weight matrix $W_z$ 310, a reset weight matrix $W_r$ 320, and a state weight matrix $W_h$ 330. Each of the weight matrices has a corresponding bias vector: an update bias vector $b_z$ 312, a reset bias vector $b_r$ 322, and a state bias vector $b_h$ 332. A GRU also receives input vectors that include a previous hidden state vector $h_{t-1}$ 340 and the current input vector $x_t$ 350. Finally, a GRU has three bias vectors: an update bias vector $b_z$ 312, a reset bias vector $b_r$, and a state bias vector $b_h$ 332. Each matrix has N rows and M columns. Meanwhile, each of the input vectors 340, 350 and the bias vectors, 312, 322, and 332, have M/2 data elements.

The data elements shown in FIG. 2 can be used to compute the output vectors of a GRU according to Equations (7)-(10) above.

Figure 4A:
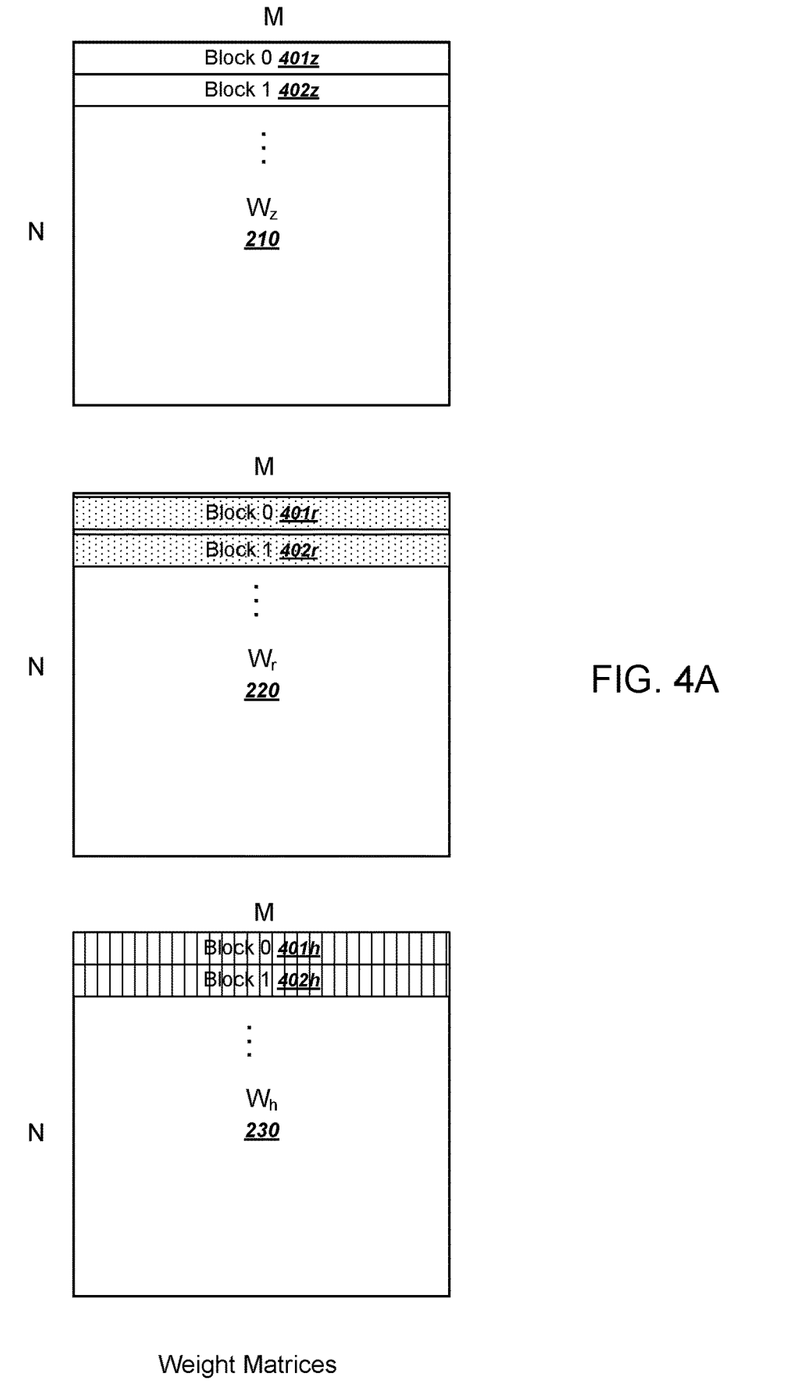
FIG. 4A illustrates how the matrix operations of a GRU can be interleaved.

FIG. 4A illustrates how the matrix operations of a GRU can be interleaved. The matrix operations being interleaved means that each block will receive some rows of each matrix.

As shown in FIG. 4A, one or more of the first rows 401z of the update weight matrix $W_z$ 210 are assigned to block 0. The next one or more rows 402z of the update weight matrix $W_z$ 210 are assigned to a different block, block 1.

Rows being assigned to a particular block means both that (1) the data from the rows will be copied into memory of the SM assigned to execute the block, and (2) that one or more threads belonging to the block will perform the corresponding matrix operations for the rows when the one or more threads are executed by the SM.

The actual matrix values, and therefore their corresponding matrix operations, can be assigned by thread or by warp. For example, each of the threads in a block can be assigned one or more values from one of the rows of the update weight matrix $W_z$ 210.

In some implementations, the system stores each matrix value with half precision, which allows each register to store two matrix values. Thus, each thread in the block can allocated a single register to store two adjacent row values.

As described above, on some parallel processing devices, a warp is the smallest assignable unit of work. Therefore, individual rows can be assigned to respective warps belonging to the block. The rows that are assigned to a single warp can be assigned in any appropriate way, e.g., continuously or grid-strided. This can result in the matrices being interleaved at the warp level in addition to being interleaved at the block level. In other words, every warp is assigned some values from all three weight matrices. In addition, the matrices can also be interleaved at the thread level, meaning that every thread can be assigned some values from all three weight matrices.

Within a row assigned to a warp, each thread can be assigned a number of row values given by M/# threads per warp. For example, if M is 1024, each thread in a warp will be assigned 32 values per row assigned to the warp. If the values are stored in half precision, this can require using only 16 registers.

In order to exactly fit the model to the available processing hardware, the system can train a model in which M is a multiple of the number of SMs times the number of warps per block. For example, if there are 60 SMs and 8 warps per block, the system can train a model having a size that is a multiple of 480, e.g., 480, 960, or 1440, to name just a few examples. In this example, the size of a model refers to the number of columns in each of the weight matrices.

Interleaving the rows among the blocks can require that corresponding rows have a same block or warp distribution. Thus, for every row n of a first weight matrix assigned to a block m, the block m is also assigned the same row n from the other two weight matrices. Similarly, if the rows are interleaved among the blocks and the warps, for every row n of a first weight matrix assigned to a warp m, the warp m is also assigned the same row n from the other two weight matrices.

As shown in FIG. 4A, one or more of the first rows 401r of the reset weight matrix Wz 220 are also assigned to block 0, and the next one or more rows 402r of the reset weight matrix Wz 220 are assigned to a different block, block 1. Similarly, one or more of the first rows 401h of the state weight matrix Wh 230 are assigned to block 0, and the next one or more rows 402h of the state weight matrix Wh 230 are assigned to a different block, block 1.

Figure 4B:
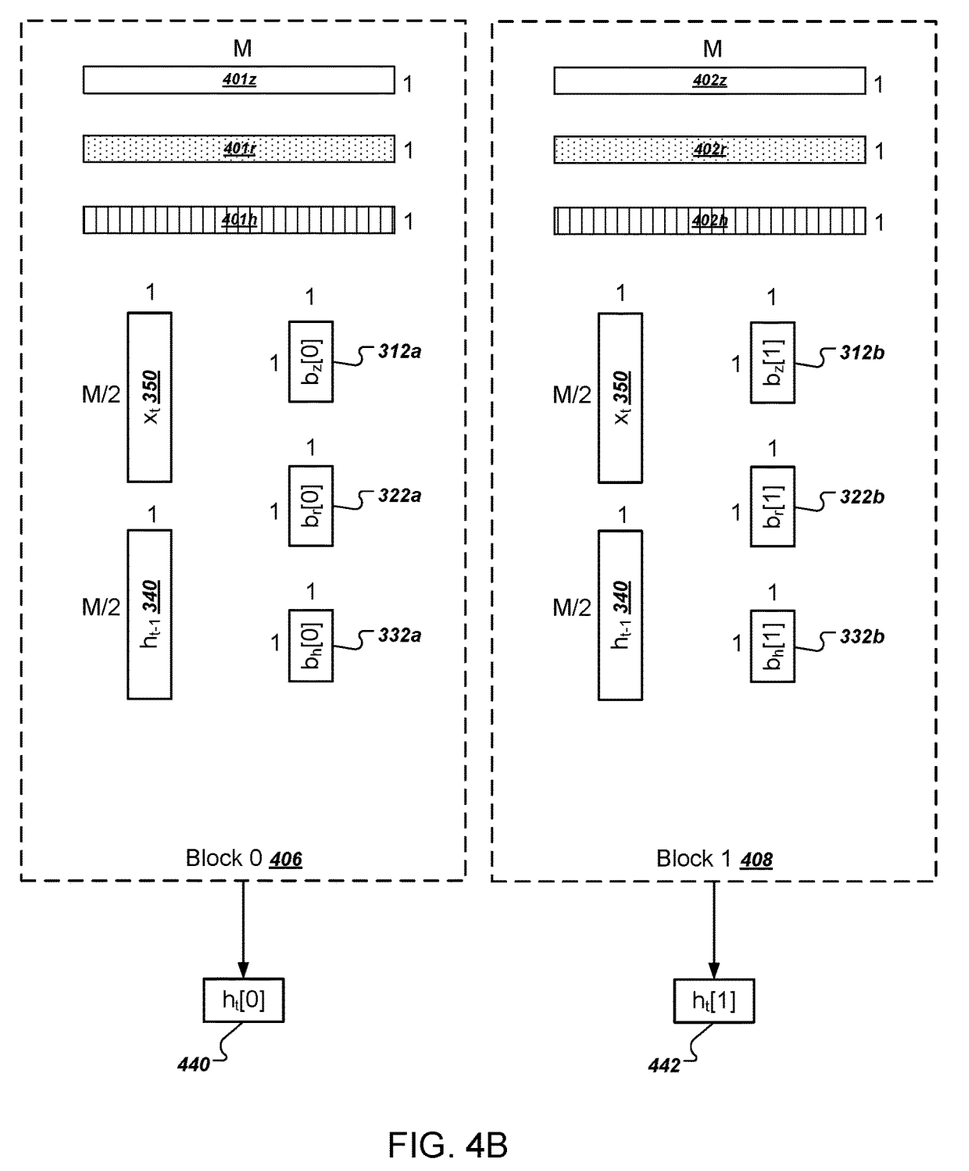
FIG. 4B illustrates how interleaving the matrices among the blocks can allow an output value for all GRU operations to be computed without a block synchronization.

FIG. 4B illustrates how interleaving the matrices among the blocks can allow an output value for all GRU operations to be computed without a block synchronization. In this example, for simplicity it is assumed that only a single row from each matrix has been assigned to each block. Thus, the following rows are assigned to block 0 406: row 0 401z of the update weight matrix Wz 210, row 0 401r of the reset weight matrix Wr 220, and row 0 401h of the state weight matrix Wh 230. And the following rows are assigned to block 1 408: row 1 402z of the update weight matrix Wz 210, row 1 402r of the reset weight matrix Wr 220, and row 1 402h of the state weight matrix Wh 230.

The input vectors $x_t$ 350 and $h_{t-1}$ 340 can be broadcast in full to all blocks. Therefore, both blocks 406 and 408 hare copies of $x_t$ 350 and $h_{t-1}$ 340.

Because the bias vectors bz, br, and bh are relatively small, they can either be broadcast in full to all blocks or also interleaved in the same way that the rows were interleaved, either by block, warp, or thread. In this example, the bias vectors are interleaved, and thus, block 0 406 has a copy of just the first element 312a of the update bias vector bz 312, the first element 322a of the reset bias vector br 322, and the first element 332a of the state bias vector 332. And therefore, block 1 has a different set of elements from the bias vectors, having just the second element 312b of the update bias vector bz 312, the second element 322b of the reset bias vector br 322, and the second element 332b of the state bias vector 332.

Once block 0 406 has this information, the threads of block 0 can implement all of the operations of the GRU defined by Equations (7)-(10) above without performing a block synchronization. In other words, no threads of block 0 need to interact with any threads from any other blocks. In this simple example, the interleaving allows block 0 406 to generate the first element 440 of the output vector $h_t$. Similarly, block 1 408 can use the data assigned to block 1 408 to generate the second element 408 of the output vector $h_t$. In a more realistic scenario, each block would generate multiple values of the output vector, and each block would generate roughly the same number of elements of the output vector $h_t$.

And thus, in some implementations all values of the output vector ht can be computed without performing any block synchronizations. The values of the output vector ht can also be computed largely in parallel with optimal or nearly optimal load balancing, particularly if the system trains a model to exactly fit the available processing hardware. In this context, computing the output vector in parallel means that substantially all SMs of the processing hardware execute blocks concurrently to generate values of the output vector without performing block synchronizations between them.

Figure 5:
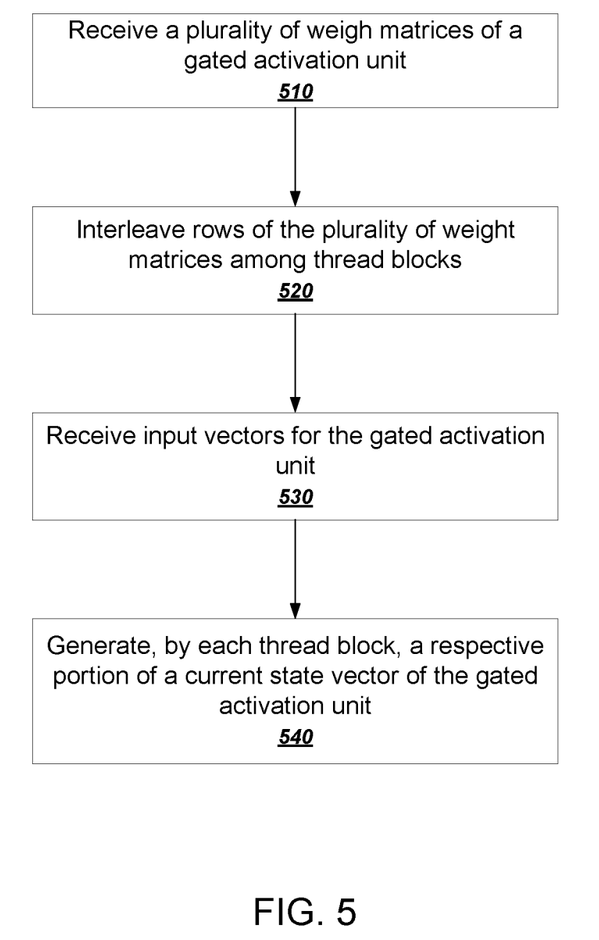
FIG. 5 is a flow chart of an example process for using parallel processing hardware to compute a current state vector of a gated activation unit.

FIG. 5 is a flow chart of an example process for using parallel processing hardware to compute a current state vector of a gated activation unit. Some of the actions described in FIG. 5 are performed by independent processing units of a parallel processing device, while some of the actions are preparatory actions that a deployment system having at least one central processing unit performs to load the appropriate data into memory of the independent processing units. For convenience, the process will be described as being performed by a system having all of these components, appropriately programmed in accordance with this specification.

The system receives a plurality of weight matrices of a gated activation unit of a neural network (510). As described above, the gated activation unit can be any appropriate neural network computation unit that receives a hidden state from a previous time step and a current input vector and generates a hidden state for a current time step. The gated activation unit can be, for example, a GRU or an LSTM unit. In some implementations, the system also receives, for each weight matrix, a respective corresponding bias vector.

The system interleaves rows of the plurality of weight matrices (520). As described above, interleaving the rows means assigning rows to thread blocks such that (1) every thread block gets some rows from every weight matrix, and (2) corresponding rows are assigned to the same thread block. In some implementations, the weight matrices are also interleaved by warp or by thread. Being interleaved by warp means that every warp gets some rows from every weight matrix and that corresponding rows are assigned to the same warp. Being interleaved by thread means that every thread gets some values from every weight matrix and that corresponding values are assigned to the same thread.

The system receives input vectors for the gated activation unit (530). As described above, the input vectors include at least a current input vector and a hidden state for a previous time step. Some gated activation units have even more input vectors. For example, an LSTM also includes a cell state vector for a previous time step.

The system generates, by each thread block, a respective portion of a current state vector (540). After interleaving the rows of the weight matrices by blocks, warps, threads, or some combination of these, each computation unit has enough data to compute a corresponding portion of the hidden state for the current time step. In general, this requires performing, by each block, a number of linear operations on the weight matrix and bias vector values assigned to the block and then applying a nonlinear activation function.

A number of implementations have been described above that specifically refer to rows and columns of a matrix. However, the same techniques can be applied equally if rows are interpreted as columns and vice versa.

In this specification, computing values in parallel or substantially in parallel means independent processing units perform operations toward generating the values over time windows that at least partially overlap. Computing values in parallel or substantially in parallel does not require all values to be computed at precisely the same time or in lockstep. In addition, some values generated by a single independent processing unit may actually be generated serially by the processing unit, but over a time window that overlaps with the computation of other values by other independent processing units.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method for implementing a neural network on a parallel processing device, the method comprising:
   receiving, by a computer-implemented system having a processor, a plurality of weight matrices of a gated activation unit of the neural network, the gated activation unit having two or more layers, each layer defining operations comprising: (i) a matrix operation between a weight matrix for the layer and concatenated input vectors and (ii) a nonlinear activation operation using a result of the matrix operation;
   interleaving, by the computer-implemented system, rows of the plurality of weight matrices by assigning groups of corresponding rows to respective thread blocks of the parallel processing device, each thread block being a computation unit for execution by an independent processing unit of a plurality of independent processing units of the parallel processing device, wherein each thread block is assigned with a respective interleaved group of rows that include one or more rows from each of the plurality of weight matrices; and
   processing, by each thread block in parallel without inter-block synchronization, the respective interleaved group of rows that include the one or more rows from each of the plurality of weight matrices assigned to the thread block to generate a respective output of the gated activation unit.

2. The method of claim 1, wherein processing, by each thread block in parallel without inter-block synchronization, the respective interleaved group of rows to generate the respective output of the gated activation unit comprises:
   receiving, by each thread block, respective input vectors; and
   generating, by each thread block in parallel without inter-block synchronization, a respective portion of a current state vector including:
      performing a plurality of partial matrix operations using one or more groups of corresponding rows of the plurality of weight matrices assigned to the thread block and a concatenation of the respective input vectors, and
      performing a plurality of nonlinear activation operations using respective results of the plurality of partial matrix operations.

3. The method of claim 1, wherein interleaving the rows comprises assigning a same number of rows to all thread blocks.

4. The method of claim 1, wherein the gated activation unit is a gated recurrent unit or a long short term memory unit of the neural network.

5. The method of claim 1, wherein the operations of a layer comprise a bias addition operation between a result of a matrix operation for the layer and a bias vector for the layer, and further comprising:
   distributing portions of the bias vector to each thread block of the thread blocks; and
   adding, by each thread block, a portion of the bias vector to a result of a matrix operation.

6. The method of claim 1, further comprising interleaving rows of the plurality of weight matrices by warps such that all warps receive some rows from every weight matrix and corresponding rows from every weight matrix are assigned to the same warp.

7. The method of claim 1, further comprising interleaving values of the plurality of weight matrices by threads such that all threads receive some values from every weight matrix and corresponding values from every weight matrix are assigned to the same thread.

8. A system configured to implement a neural network on a parallel processing device, the neural network comprising:
at least one gated activation unit having a plurality of weight matrices, the gated activation unit having two or more layers, each layer defining operations comprising: (i) a matrix operation between a weight matrix for the layer and concatenated input vectors and (ii) a nonlinear activation operation using a result of the matrix operation;
wherein the system is configured to:
interleave rows of the plurality of weight matrices by assigning groups of corresponding rows to respective thread blocks of the parallel processing device, each thread block being a computation unit for execution by an independent processing unit of a plurality of independent processing units of the parallel processing device, wherein each thread block is assigned with a respective interleaved group of rows that include one or more rows from each of the plurality of weight matrices; and
process, by each thread block in parallel without inter-block synchronization, the respective interleaved group of rows that include the one or more rows from each of the plurality of weight matrices assigned to the thread block to generate a respective output of the gated activation unit.

9. The system of claim 8, further configured to:
receive, by each thread block, respective input vectors; and
generate, by each thread block in parallel without inter-block synchronization, a respective portion of a current state vector; wherein each thread block is configured to:
perform a plurality of partial matrix operations using one or more groups of corresponding rows of the plurality of weight matrices assigned to the thread block and a concatenation of the respective input vectors, and
perform a plurality of nonlinear activation operations using respective results of the plurality of partial matrix operations.

10. One or more non-transitory computer storage media encoded with computer program instructions that, when executed by one or more computers, cause the one or more computers to perform operations comprising:
receiving a plurality of weight matrices of a gated activation unit of a neural network to be executed on a parallel processing device, the gated activation unit having two or more layers, each layer defining operations comprising: (i) a matrix operation between a weight matrix for the layer and concatenated input vectors and (ii) a nonlinear activation operation using a result of the matrix operation;
interleaving rows of the plurality of weight matrices by assigning groups of corresponding rows to respective thread blocks of the parallel processing device, each thread block being a computation unit for execution by an independent processing unit of a plurality of independent processing units of the parallel processing device, wherein each thread block is assigned with a respective interleaved group of rows that include one or more rows from each of the plurality of weight matrices; and
processing, by each thread block in parallel without inter-block synchronization, the respective interleaved group of rows that include the one or more rows from each of the plurality of weight matrices assigned to the thread block to generate a respective output of the gated activation unit.

11. The one or more non-transitory computer storage media of claim 10, wherein the computer program instructions further cause the one or more computers to perform:
receiving, by each thread block, respective input vectors; and
generating, by each thread block in parallel without inter-block synchronization, a respective portion of a current state vector including:
performing a plurality of partial matrix operations using one or more groups of corresponding rows of the plurality of weight matrices assigned to the thread block and a concatenation of the respective input vectors, and
performing a plurality of nonlinear activation operations using respective results of the plurality of partial matrix operations.

12. The one or more non-transitory computer storage media of claim 10, wherein interleaving the rows comprises assigning a same number of rows to all thread blocks.

13. The one or more non-transitory computer storage media of claim 10, wherein the gated activation unit is a gated recurrent unit or a long short term memory unit of the neural network.

14. The one or more non-transitory computer storage media of claim 10, wherein:
the operations of a layer comprise a bias addition operation between a result of a matrix operation for the layer and a bias vector for the layer; and
the computer program instructions further cause the one or more computers to further perform:
distributing portions of the bias vector to each thread block of the plurality of thread blocks; and
adding, by each thread block, a portion of the bias vector to a result of a matrix operation.

15. The one or more non-transitory computer storage media of claim 10, wherein the computer program instructions further cause the one or more computers to perform:
interleaving rows of the plurality of weight matrices by warps such that all warps receive some rows from every weight matrix and corresponding rows from every weight matrix are assigned to the same warp.

* * * * *